(No Model.)
C. E. DUTTON, Jr.
GALVANIC BATTERY.
No. 442,516. Patented Dec. 9, 1890.
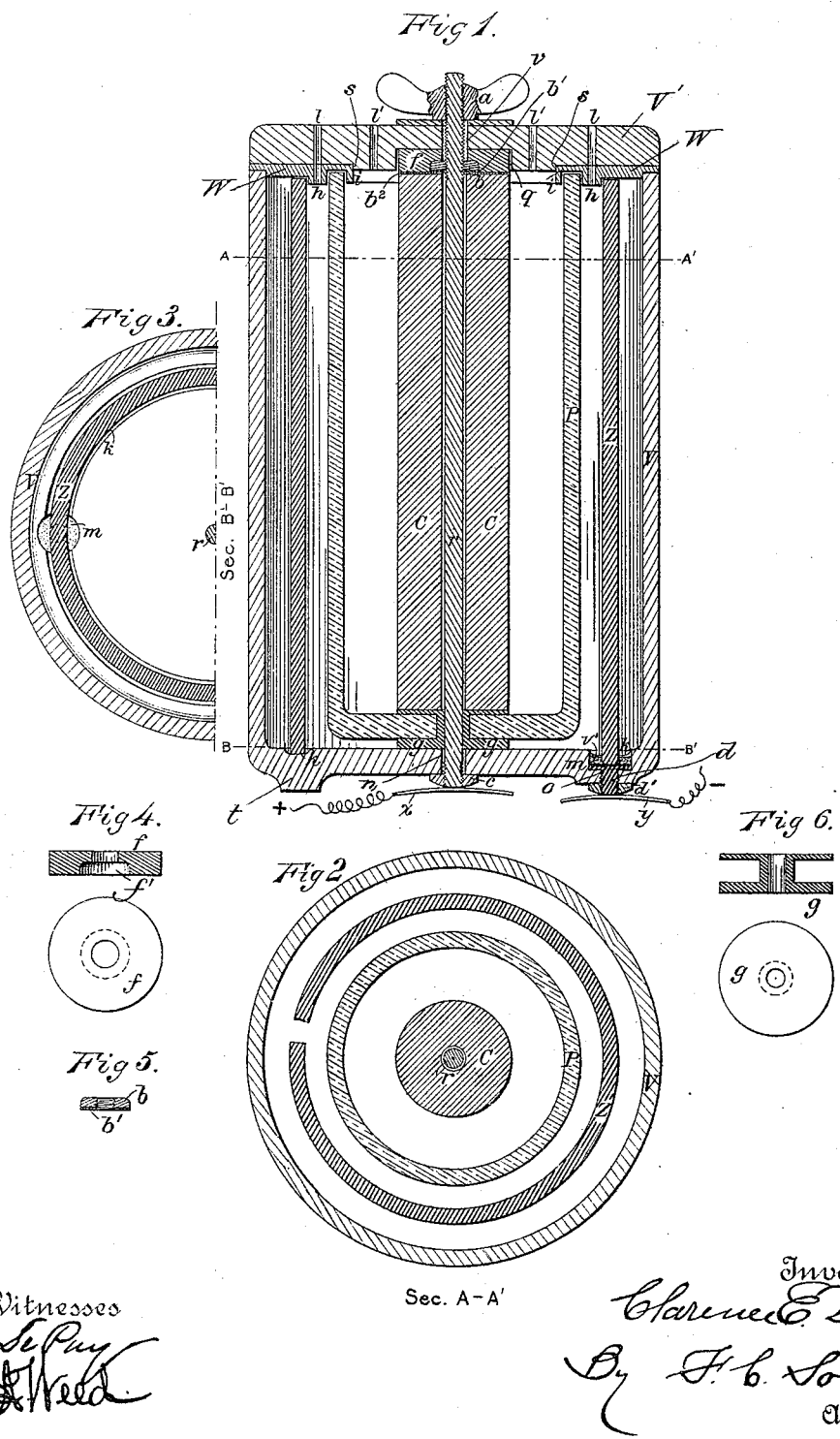

UNITED STATES PATENT OFFICE.

CLARENCE E. DUTTON, JR., OF WASHINGTON, DISTRICT OF COLUMBIA.

GALVANIC BATTERY.

SPECIFICATION forming part of Letters Patent No. 442,516, dated December 9, 1890.

Application filed September 6, 1890. Serial No. 364,141. (No model.)

*To all whom it may concern:*

Be it known that I, CLARENCE E. DUTTON, Jr., a citizen of the United States, residing at Washington, in the District of Columbia, have invented certain new and useful Improvements in Galvanic Batteries, of which the following is a specification.

The objects of the invention are to secure in a battery stability or fixity of its internal parts in their proper relative positions, to the end that constancy of current and a prolonged run of a single charge may be attained without restriction of the rate of discharge, automatic circuit-connections, and portability of such a character that the cell may be roughly handled and carried about either in vehicles or by hand without danger of breakage or derangement.

In the ordinary cells of primary batteries open at the top importance is not often attached to a symmetrical position of the electrodes with respect to each other, nor to the rigid maintenance of such a position. The importance of it, however, is great. Since the internal resistance is inversely proportioned to the square of the distance between the electrodes, if the carbon be nearer to one portion of the zinc than to the other portions the action on the zinc will be greatest at those points which are nearest to the carbon. In other words, some portions of the zinc will be corroded more rapidly than the others, and the plate or cylinder will be destroyed while a large portion of its substance is unconsumed, thus entailing a great waste of zinc. Furthermore, the total internal resistance of the battery will be a minimum when the carbon is everywhere equidistant from the zinc. Hence, so far as the rate of discharge is dependent upon internal resistance, it will be a maximum when the surfaces of the two electrodes are equidistant.

Figure 1 of the accompanying drawings represents a vertical section of this improved battery. Fig. 2 represents a horizontal section thereof on line A A' of Fig. 1. Fig. 3 represents a horizontal half-section on line B B' of Fig. 1. Fig. 4 represents in section and in plan the differential elastic washer which is interposed between the cover and the carbon electrode. Fig. 5 represents in section a nut on the clamping-rod between the central portion of said washer and the carbon electrode. Fig. 6 represents in vertical section and in plan a double washer disposed at the bottom of the porous cup.

Similar letters of reference indicate corresponding parts in the different figures.

This improved primary electric battery comprises an outer vessel or jar V, a cover V' for closing the top thereof, a positive electrode Z, a porous cup P, a negative electrode C, and means for fixing said parts in their normal relative positions, as hereinafter described.

The jar V is constructed of vulcanite, fiberite, or other suitable material in cylindrical or other suitable form. The bottom of this jar is provided with a central aperture $n$ and an eccentric aperture $o$, with a shallow groove $k$ on its interior near the outer wall of the jar, and with a well $m$ in said groove opposite the eccentric-aperture. The cover V' is provided with a central recess $q$ and a shoulder $s$ on its under side and with a central aperture $v$ and holes $l\ l'$. An elastic washer W is disposed on the under side of the cover and extends inward from the periphery thereof to the shoulder $s$. This washer is preferably composed of soft rubber, and is provided with holes registering with the holes $l$ in the cover and with a rib $h$ and a groove $i$ on its inner face.

The zinc electrode Z preferably corresponds in shape to the shape of the outer vessel V, and is adapted to rest at its lower end in the groove $k$ at the bottom of said vessel and at its upper end against the elastic washer W outside the rib $h$ thereof. This electrode is preferably open at one side, as shown in Fig. 2, to permit the free access of the exciting-liquid to both the inner and outer surfaces of the electrode.

The porous cup P is provided with a central hole in its bottom, and a spool-shaped duplex elastic washer $g$, composed of soft rubber or other suitable material, is applied thereto. The tubular body of this washer extends through said hole, and the upper and lower flanges or heads thereof overlap the inner and outer surfaces of said bottom around said hole. This cup is disposed in the jar concentric with the zinc electrode, its upper end resting in the annular groove $i$ in the cover-washer W and its lower end resting on the lower flange or head of the spool-shaped elastic washer $g$, which is interposed between its bottom and the bottom of the jar. Both the upper and lower ends of the porous cup are thus supported by elastic bearings.

The carbon electrode C is disposed in the porous cup P, and has an elastic bearing at its lower end on the upper flange or head of the spool-shaped washer $g$ between it and the bottom of the porous cup. This electrode is rendered hollow by a central axial bore, and in external shape it preferably corresponds with the shape of the zinc electrode.

A clamping-rod $r$ extends through the bore of the carbon electrode C and through the spool-shaped washer $g$, disposed in the bottom of the porous cup, and projects at its lower end through the central aperture $n$ in the bottom of the jar V and at its upper end through the central aperture $v$ of the cover. This rod is provided at its lower end outside the bottom of the jar with a head, preferably in the form of a nut $c$, screwed thereon. The upper portion of the rod is screw-threaded, and clamping-nuts $a$ and $b$ are disposed thereon, the nut $b$ being inside the cover and the nut $a$ outside thereof. The nut $b$ is screwed down tightly against the upper end of the carbon electrode and serves to clamp said electrode against its elastic bearing in the bottom of the porous cup. This nut $b$ is smaller than the top of the electrode, and an elastic soft-rubber washer $f$, having a central recess on its under side to receive said nut, is disposed in the central recess $q$ of the cover and covers said nut and that portion of the end of the carbon not covered by the nut. This washer prevents access of acid to the nut $b$ and clamping-rod and makes a tight joint with the cover, preventing the escape of the exciting-liquid. The winged clamping-nut $a$ outside the cover serves to clamp the cover in position, and when it is tightly screwed down the central thinner portion of the washer $f$ bears harder upon the nut $b$ than the outer thicker portion thereof bears upon the end of the electrode. Hence I term said washer a "differential" washer. This is essential, because if the whole pressure of the washer were upon the top of the carbon the latter would be pushed away from its contact with the nut $b$ by the elastic yielding of the spool below, and also the head of the bolt at the bottom of the jar might be in danger of breaking in the bottom if the winged nut were excessively tightened. There is, however, sufficient pressure upon the elastic washer $f$ and upon the elastic spool $g$ through the nut $b$, cup P, and cover V to compress said washer and spool and cause them to tightly close the central apertures in the bottoms of the porous cup and jar and in the cover against leakage of the exciting-liquids.

The clamping-rod, its nuts, and the cover secure all the parts rigidly in their proper relative positions, and the elastic bearings at the upper and lower ends of the carbon and porous cup permit rough handling of the cell without breakage. The clamping-rod $r$ also constitutes one of the poles of the cell, its head $c$ at the bottom of the cell serving in lieu of an ordinary binding-post.

The course of the current from the carbon electrode is through the nut $b$ at the upper end of said electrode and through said clamping-rod to the bottom of the jar. The lower face of the nut $b$ is preferably plated with gold $b'$, and the top of the carbon has preferably a film of gold $b^2$ electrolytically deposited on it, in order to protect the contact against corrosion by acid or corrosive fumes, and also against the creeping of salts, which in ordinary open jars usually impair or interrupt the circuit and diminish the current. By this connection constant active electric contact is secured between the nut and the carbon. The access of corroding agents is further prevented by the differential washer. The current from the zinc electrode also passes out through the bottom of the cell. A polar piece in connection with said electrode projects through the eccentric-aperture $o$ in said bottom. This polar piece, as shown, consists of a short bolt $d$, the head of which rests in the well $m$ directly beneath the zinc electrode. The well is filled with a zinc amalgam $v'$, whereby the bolt is protected from the acid, and the zinc cylinder or prism has a small stud upon its lower edge, which projects into the amalgam and forms the contact. This bolt is provided with a nut $d'$ outside the bottom of the jar.

In assembling the parts the elastic spool-shaped washer $g$ is passed through the hole in the bottom of the porous cup P and said cup placed within the jar V. The clamping-rod $r$ is then passed through the central aperture in the bottom of the jar, through the spool-shaped washer, and through the porous cup. The hollow carbon electrode C is then passed over said rod and the nut $b$ screwed onto the upper end of said rod down against the upper end of said electrode, clamping it in position and forming a contact therewith. The washer $f$ is then passed over the upper end of the rod $r$ onto the upper end of the carbon electrode. The zinc electrode Z is then placed in position within the jar V and the jar filled with the exciting-liquid. The cover V' is then placed in position on said jar. The clamping-nut $a$ is then screwed onto the upper end of the clamping-rod $r$, down against the cover V', and serves to hold the parts together and fix them firmly in their relative positions, and the cell is ready for use. The holes $l$ and $l'$ serve as vents for the gases.

In the use of the cell it is simply placed upon a shelf, table, or other suitable support, and so adjusted thereon that the pole-pieces $c$ and $d'$ at the bottom of the jar come in contact with the metal straps $x$ and $y$, connected with the wires of the circuit. These metal straps are preferably composed of spring metal, so as to spring up from the surface of the table or shelf into contact with the poles of the battery.

I claim as my invention—

1. The combination of a battery-jar, a cover therefor, electrodes disposed in said jar, and a clamping-rod provided with a head and nut and extending through said jar and projecting through the bottom and cover thereof.

2. In a battery-cell, the combination of a jar having a groove in its bottom, an electrode resting at its lower end in said groove, a cover for said jar engaging said electrode, and a clamping-rod provided with a head and nut and extending through said jar and through the bottom and cover thereof.

3. In a battery-cell, the combination of a jar having a groove in its bottom, an electrode resting at its lower end in said groove, a cover for said electrode provided on its inner face with an elastic washer engaging the upper end of said electrode, and a clamping-rod provided with a head and nut and extending through said jar and through the bottom and cover thereof.

4. The combination of a battery-jar, a cover therefor, a positive electrode disposed in said jar, a hollow carbon electrode disposed in said jar, elastic bearings for the ends of the carbon electrode, and a clamping-rod provided with a head and nut and extending through said hollow electrode and through the bottom and cover of said jar.

5. In a battery-cell, the combination of a battery-jar, a hollow carbon electrode disposed therein, an elastic washer interposed between the lower end of said electrode and the bottom of said jar, a rod extending through said electrode and washer and through the bottom of the jar and provided with a head outside said bottom, and a nut on said rod engaging the upper end of said electrode.

6. In a battery-cell, the combination of a jar, a cover therefor, a positive electrode, a hollow negative electrode, an elastic washer interposed between the lower end of said negative electrode and the bottom of said jar, a rod extending through the hollow electrode and washer and through the bottom and cover of the jar, said rod being provided with a head outside said bottom, a nut on said rod engaging and covering a portion of the upper end of said hollow electrode, a differential elastic washer interposed between said cover and the upper end of said electrode and covering said nut, and a nut on said rod outside said cover.

7. The combination of a battery-jar, a positive electrode disposed therein, a hollow carbon electrode also disposed in said jar, a metallic rod extending through said carbon electrode and through the bottom of the jar, and a conductive contact-piece between said carbon electrode and said rod, substantially as described.

8. In a battery-cell, the combination of a jar, a porous cup therein, elastic bearings at both ends of said cup, a carbon electrode disposed in said cup, and an elastic bearing disposed between the lower end of said electrode and the bottom of said cup.

9. In a battery-cell, the combination of a jar, a porous cup therein provided with a hole in its bottom, a hollow carbon electrode within said cup, an elastic spool-shaped washer the body of which extends through said hole, the lower head thereof being interposed between the bottoms of the cup and jar and the upper head between said carbon electrode and the bottom of the cup, and a clamping-rod provided with a head and nut and extending through said carbon electrode and through said spool and projecting through the bottom of the jar.

10. A battery-cell having a carbon electrode supported at its lower end on an elastic bearing and at its upper end on a fixed and elastic bearing, substantially as described.

11. A battery-cell having a porous cup provided with a hole in its bottom and an elastic spool-shaped washer disposed therein, the flanges of said spool-shaped washer overlapping the inner and outer surface of said cup around said hole.

12. A battery-cell having a hollow carbon electrode, a metallic rod passing therethrough and serving as the positive pole, and a nut on said rod engaging said electrode.

13. The combination of a battery-jar, a porous cup disposed in said jar and provided with an aperture in its bottom, an elastic bearing between the bottoms of said cup and jar, an electrode in said jar outside said cup, a carbon electrode disposed in said cup on an elastic bearing between the lower end of said carbon electrode and said cup, and means for holding the upper end of said carbon electrode.

14. The combination of a battery-jar provided with apertures in its bottom, a zinc electrode disposed in said jar, a carbon electrode also disposed in said jar, and metallic pole-pieces in connection with said electrodes and extending through said apertures.

15. The combination of a battery-jar provided with apertures in its bottom and with a well opposite one of said apertures, electrodes disposed in said jar, one of said electrodes having a projection extending into said well, and metallic pole-pieces in connection with the electrodes and extending through said apertures.

CLARENCE E. DUTTON, JR.

Witnesses:
C. E. DUTTON,
F. C. SOMES.